United States Patent [19]

Miyake et al.

[11] Patent Number: 4,887,222

[45] Date of Patent: Dec. 12, 1989

[54] METHOD FOR CONTROLLING OPERATION OF INDUSTRIAL ROBOT

[75] Inventors: Norihisa Miyake, Matsudo; Masaki Sumita, Yachiyo, both of Japan

[73] Assignees: Hitachi, Ltd., Tokyo; Hitachi Keiyo Engineering Co., Ltd., Narashino, both of Japan

[21] Appl. No.: 213,137

[22] Filed: Jun. 29, 1988

[30] Foreign Application Priority Data

Jul. 1, 1987 [JP] Japan ................................ 62-162358

[51] Int. Cl.[4] ........................ G05B 19/18; G05B 19/42
[52] U.S. Cl. ........................................ 364/513; 901/2; 901/15
[58] Field of Search ........................ 364/513, 191–193; 901/2, 15, 3, 9; 318/568

[56] References Cited

U.S. PATENT DOCUMENTS 4,308,584 12/1981 Arai ...................................... 364/513
4,763,276 8/1988 Perreirra et al. ..................... 364/513

OTHER PUBLICATIONS

Efficient Computation of the Jacobian for Robot Manipulators; by Orin et al.; The Int'l J. of Robotics Research; vol. 3, No. 4; Winter 1984.

Primary Examiner—Allen MacDonald
Attorney, Agent, or Firm—Antonelli, Terry & Wands

[57] ABSTRACT

There is provided an operation control method for an industrial robot having a plurality of joints, cooperation of these joints allowing a hand or an end effector attached to the hand to perform necessary operation comprising the steps of representing a position and orientation of a hand effecting point relatively determined with respect to the hand or the end effector by a generalized coordinate system suitable for describing the task, deriving respective displacement values of the plurality of joints corresponding to the position and orientation information by using means such as computation, and making the hand effecting point perform necessary operation. For at least one joint among the plurality of joints, displacement is approximately derived by using approximate solution. For remaining joint among the plurality of joints satisfying a parameter or parameters to be controlled especially accurately among the position or position and orientation of the hand effecting point, strict solutions are derived by using the approximate solution of the above described at least one joint. the operation of the hand effecting point is thus controlled.

5 Claims, 4 Drawing Sheets

METHOD FOR CONTROLLING OPERATION OF INDUSTRIAL ROBOT

BACKGROUND OF THE INVENTION

The present invention relates to an operation control method for an industrial robot, and in particular to an operation control method for allowing an industrial robot having a complicated mechanical structure such as an articulated type structure (or a robot) to operate while controlling the position and orientation of an end effecting point of the industrial robot.

In a conventional popular method for making an industrial robot perform desired operation, points on a path to be traced by a hand of the robot or an end effector attached to the hand are successively taught (by guiding the robot to positions of these points, for example), the space between these taught points is interpolated by straight lines, circular arcs or the like to realize the operation. In an alternatively conceivable method, a path to be traced by an end effector attached to the hand of a robot is given beforehand in the form of a computational expression represented by a generalized coordinate system suitable to describe a working path (or operating path), and a robot is activated by using the computational expression without using teaching.

For activating a robot by using these methods in any case, it becomes indispensable to use transformation computation from a generalized coordinate system describing working paths to a robot coordinate system having a displacement of each joint constituting the mechanism of the robot as the coordinate axes. (As the generalized coordinate system, rectangular coordinate system having an origin fixed at one point on a base stand of the robot, for example, is used.) That is to say, transformation computation for deriving the displacement of each joint of the robot such as the angle of a revolute joint is performed to realize the position and orientation of an end effector of the robot represented by the generalized coordinate system. In addition, it is necessary in principle to perform this computation in real time in synchronism with the operation of the robot to control the robot.

The commonly-applied method for this transformation computation, i.e., transformation from a generalized coordinate system to a robot-joint coordinate system, is such that a strict solution is analytically derived. A concrete example of this method is described in R. Paul, "Robot Manipulators", MIT Press, 1981, pp. 73-82. In the method of this example, computational expressions for transformation from a robot-joint coordinate system to a generalized coordinate system are derived, and therefrom computational expressions algebraically inverse computation, i.e., transformation from the generalized coordinate system to the robot-joint coordinate system are derived. It is a matter of course that there are other methods such as a method of obtaining necessary transformation computational expressions by using geometrical relationship.

In this exemplified method, on the basis of the position and orientation of an end effector of a robot hand represented by a generalized coordinate system, displacement (such as an angle of a revolute joint) of each joint of the robot satisfying the position and orientation is derived. In a method known in a field such as a field of master-slave manipulators similar to the industrial robots, the movement of a manipulator is represented by generalized coordinates as the linear velocity and the rotational velocity of an end effector of the manipulator hand, and the velocity of each joint of the manipulator (such as an angular velocity in case of a revolute joint) supplying the velocity represented by the generalized coordinates is derived to control the operation. A concrete example of this method is described in "Resolved Motion Rate Control", IEEE Transactions on Man-Machine Systems, MMS-10(2), pp. 47-53, 1969 et al. written by Daniell Whitney, for example. This method uses so-called Jacobian matrix of coordinate transformation matrix providing the relationship between displacement of a joint in the robot-joint coordinate system and the position and the pose in the generalized coordinate system. In this case, the Jacobian matrix has elements obtained as a result of partially differentiating each variable representing the position and the orientation in the generalized coordinate system by each variable in the robot-joint coordinate system. By using the inverse matrix of this matrix, it is possible to derive a velocity or an angular velocity which is the time differential (i.e. differential with respect to time) of displacement of each joint of a robot or a manipulator corresponding to the time differential, i.e., the velocity or angular velocity of the position and orientation of the end effector in the generalized coordinate system. It is thus possible to control the operation of the robot or the manipulator by using the resultant velocity or angular velocity.

The relationship between the displacement of each joint of a robot and the position and orientation of the end effector or the transformation expressions between the robot-joint coordinate system and the generalized coordinate system apparently vary depending upon the arrangement and configurational structure (or configuration) of the joints of the robot. Similarly, the form of the Jacobian matrix also varies depending upon the mechanism and structure of the robot. Several methods were proposed for definition and introduction of the generalized coordinate system with respect to the Jacobian matrix as collected in Orin and Schrader, "Efficient Computation of the Jacobian for Robot Manipulators", International Journal of Robotics Research, Vol. 3, No. 4, 1984.

Respective different problems remain in the first two conventional techniques described above. The contents of the first two conventional techniques will now be described successively.

In the first method, the computational expressions for transformation from a generalized coordinate system to a robot-joint coordinate system are derived as, so to speak, an analytical strict solution by using a technique such as an algebraic technique or a geometrical technique. This method has a merit that it is possible to obtain displacement of each joint of the robot mechanism correctly satisfying the requirement of the specified position of the end effecting point and specified orientation of the end effector. On the other hand, however, it becomes difficult to derive the above described transformation computational expressions for some forms of joint arrangement of robot mechanism, transformation computation being substantially prohibited in some cases. This will now be described in more detail. Whatever the joint arrangement of the robot mechanism may be, it is possible to derive the computational expressions for transformation from the robot-joint coordinate system to the generalized coordinate system by successively calculating coordinate conversion matrices by utilizing, for example, notation of Denavit and Hartenberg as described in "A kinematic notation for lower-pair mechanisms based on matrices", ASME Journal Applied Mechanics, Vol. 23, pp. 215–221, 1955. The transformation computation from the robot-joint coordinate system to the generalized coordinate system is hereafter referred to as "direct kinematics", and computation expressions for this purpose are hereafter referred to as "direct kinematic equation". On the other hand, the computational expressions for transformation from the generalized coordinate system to the robot-joint coordinate system, i.e., the transformation computational expressions for deriving, from the position of the end effecting point and the end effecting orientation, displacement of each joint of the robot satisfying the requirement of the position and orientation (hereafter referred to as "inverse kinematic equation") can be obtained by inversely solving the above described direct kinematic equation.

Letting a multi-dimensional vector having, as its elements, respective parameters of the position and pose of the end effecting point of the robot represented by the generalized coordinate system be $\vec{X}$ and a multi-dimensional vector having, as its elements, displacements of respective joints represented by the robot-joint coordinate system be $\vec{\theta}$, the direct kinematic equation can be defined as a function $$\vec{X} = f(\vec{\theta}). \tag{1}$$

At this time, the inverse kinematic equations are represented as the inverse function of the expressions of (1) as $$\vec{\theta} = f^{-1}(\vec{X}). \tag{2}$$

When the form of a function f is given, the form of the inverse function $f^{-1}$ cannot always be derived from the viewpoint of mathematics. Even if the above described expression of direct kinematic is given in case of robot mechanism as well, it does not necessarily follow that "expression of inverse kinematics" which is the inverse of "expression of direct kinematics" can always be derived with ease. To be concrete, in deriving the expression for inverse kinematics by using an algebraical solution such as successive substitution and elimination of respective parameters of the robot-joint coordinate system out of the expression of direct kinematics, the number of orders of an equation might become higher at some calculation stage or an equation might include a multiple transcendental function. In such a case, the form of the expression for inverse kinematics providing a so-called analytical strict solution cannot be derived definitely. Geometrical meaning of this fact will be supplementarily described in "DESCRIPTION OF THE PREFERRED EMBODIMENTS" of the present invention as well.

In operation control of a robot, the above described computation of inverse kinematics must be performed in real time during the operation of the robot when an effecting point of the robot is moved on a straight line in the space, for example. If the computational expression directly providing each displacement of each joint of the robot corresponding to the specified position and orientation of the end effecting point is apparent and can be easily calculated, there is no problem in operation control. If the expression of inverse kinematics cannot be obtained or is so complicated that it may not be calculated easily, the solution must be derived with convergence computation or the like by using a technique such as numerical analysis. Application to operation control in real time is thus difficult in the aspect of computation amount as well. In that, it becomes impossible to control the operation of the robot while controlling the position and pose of the end effecting point represented by the generalized coordinate system.

The second method of the prior art will now be described. In the second method, the Jacobian matrix of the function f of the expressions (1) shown in the description of the first method is used. A multi-dimensional vector $\vec{X}$ having respective parameters of the position and pose of the end effecting point of the robot as elements shown in the expressions (1) is represented as $$\vec{X} = (X_1, X_2, \ldots, X_n)^T \tag{3}$$

where T denotes transpose and n represents the number of control parameters.

Likewise, the multi-dimensional vector $\vec{\theta}$ having displacement values of respective joints of the robot is represented as $$\vec{\theta} = (\theta_1, \theta_2, \ldots, \theta_m)^T \tag{4}$$

where m represents the number of joints and $n \leq 6$ under normal conditions. It is said that the robot has no redundant degree of freedom when m=n.

It is now assumed that a matrix has $\delta x_i / \delta \theta_j$ as an element belonging to the i-th row, and the j-th column. This is called Jacobian matrix and is an important matrix providing relationship between the displacement velocity of each joint of a robot (hereafter referred to as velocity or angular velocity of each joint of a robot) and the velocity of an end effecting point of the robot and an angular velocity of change in effecting orientation at that point (hereafter collectively referred to as velocity and angular velocity of effecting point). Since the Jacobian matrix is usually a function of displacement of each joint of the robot, it is herein written as $J(\vec{\theta})$. Writing the differential of the above described velocity of each joint of the robot, i.e., the differential of displacement of each joint of the robot as $\dot{\vec{\theta}}$ and writing the differential of the velocity and the angular velocity of the end effecting point, i.e., the differential of the position and orientation of the end effecting point as $\dot{\vec{X}}$, it follows that $$\dot{\vec{X}} = J(\vec{\theta}) \cdot \dot{\vec{\theta}} \tag{5}$$

and $$\dot{\vec{\theta}} = J^{-1}(\vec{\theta}) \cdot \dot{\vec{X}} \tag{6}$$

where $J^{-1}(\vec{\theta})$ exists whenever $J(\vec{\theta})$ is regular. At this time, $J^{-1}(\vec{\theta})$ can be always be derived from $J(\vec{\theta})$ analytically. If the velocity or angular velocity of an end effecting point of a robot is given, the velocity of each joint of the robot corresponding thereto is obtained as a strict solution so long as $J(\vec{\theta})$ is regular. When $J(\vec{\theta})$ is regular, the value of the Jacobian matrix, i.e., the Jacobian determinant (or so-called Jacobian) does not become zero. That is to say, relation det $J(\vec{\theta}) \neq 0$ holds true. Further, the pose of the robot causing relation det $J(\theta) = 0$ (which is different from the orientation of the end effecting point and is so-called configuration of robot) is called singular configuration and has important meaning in robot control.

In this method using the Jacobian matrix, i.e., the second method of the prior art, the velocity of each joint of a robot is derived from a given velocity of an end effecting point by using the expression (6). From the aspect of position control of robot, this method has a problem. When this method is used, the position and orientation of the end effecting point of the robot are obtained as a result of integrating both sides of the expression (5). It should be noted that $J(\vec{\theta})$ is a function of $\vec{\theta}$. In other words, the Jacobian matrix $J(\vec{\theta})$ is the differential of the function $f(\vec{\theta})$ and is nothing but a result of linearizing the function $f(\vec{\theta})$ at a value $\vec{\theta}$. Hence the Jacobian matrix provides only an approximate value in the vicinity of $\vec{\theta}$(parameter)=$\vec{\theta}$(constant).

This fact will now be further described from a different viewpoint. When the operation of a robot is to be controlled on the basis of computation by using the expression (5) or (6), a digital computer such as a microcomputer is usually used. This computation needs a finite time. Assuming now that this time is $\Delta t$, since $\Delta t$ cannot be made zero, the expression (6) is realized in a form obtained by using $\Delta \vec{x}/\Delta t$ instead of $\vec{X}$ and $\Delta \vec{\theta}/\Delta t$ instead of $\vec{\theta}$. Here $\Delta \vec{x}/\Delta t$ and $\Delta \vec{\theta}/\Delta t$ can be written as $$\frac{\Delta \vec{X}}{\Delta t} = \left( \frac{\Delta X_1}{\Delta t}, \frac{\Delta X_2}{\Delta t}, \ldots, \frac{\Delta X_n}{\Delta t} \right)^T \tag{7}$$

$$\frac{\Delta \vec{\theta}}{\Delta t} = \left( \frac{\Delta \theta_1}{\Delta t}, \frac{\Delta \theta_2}{\Delta t}, \ldots, \frac{\Delta \theta_n}{\Delta t} \right)^T \tag{8}$$

where $\Delta X_i \approx \dot{X}_i \cdot \Delta t$ $\Delta \theta_j \approx \dot{\theta}_j \cdot \Delta t.$ At this time, the expression (6) becomes $$\frac{\Delta \vec{\theta}}{\Delta t} \approx J^{-1}(\theta) \frac{\Delta \vec{X}}{\Delta t}. \tag{9}$$

Therefore, multiplying both sides with $\Delta t$, it follows that $$\Delta \vec{\theta} \approx J^{-1}(\vec{\theta}) \Delta \vec{X} \tag{10}$$

where $$\Delta \vec{\theta} = (\Delta \theta_1, \Delta \theta_2, \ldots, \Delta \theta_m)^T \tag{11}$$

$$\Delta \vec{X} = (\Delta X_1, \Delta X_2, \ldots, \Delta X_m)^T. \tag{12}$$

Letting the position and orientation of an end effecting point of a robot at certain time be $\vec{X}_A$, displacement of each corresponding joint of the robot be $\vec{\theta}_A$, and the position and orientation of the end effecting point of the robot which becomes the next target at this time be $\vec{X}_B$, therefore, $\Delta \vec{\theta}$ is obtained from the expression (10) by letting $$\Delta \vec{X} = \vec{X}_B - \vec{X}_A \tag{13}$$

Each joint displacement $\vec{\theta}_B$ of the robot which should correspond to $X_B$ is obtained by the relation $$\vec{\theta}_B \approx \vec{\theta}_A + \Delta \vec{\theta}. \tag{14}$$

That is to say, this is an approximation expression and essentially has an error. This fact is apparent because the robot moves during a time $\Delta t$ as a result of operation control and a resultant change in displacement of each joint of the robot changes the value of the inverse Jacobian matrix $J^{-1}(\vec{\theta})$ which is a function of $\vec{\theta}$. Even if such an error is caused in a manipulator of master-slave scheme, for example, feedback with respect to the position and orientation of a slave manipulator is effected via a human operator in a master manipulator manipulated by the operator, and hence the slave manipulator is conversed to an originally desired path of operation. In many cases, therefore, this error does not pose a problem in practical use. However, an error is essentially unavoidable when this method is used, which is nonetheless a problem of this method. The problem remains especially when this method is used for the operation control scheme of teaching playback type industrial robots.

SUMMARY OF THE INVENTION

An object of the present invention is to provide a control method for industrial robot free from the problems of the above described two conventional techniques, i.e., the problem of the first method in that the derivation of "expression of inverse kinematics" is difficult for some joint arrangements or structures of robot mechanism and the problem of the second method in that approximation error is unavoidable.

In order to achieve this object, in accordance with one aspect of the present invention, a plurality of parameters indicating the position and orientation of an end effecting point of a robot are separated into, for example, parameters (group) needing accurate control and parameters (group) permitting errors of some degree. As for at least one joint among robot joints which exert no influence or insignificant influence on the above described parameters needing accurate control, the displacement is derived by computation as an approximate value using the Jacobian matrix. By using the thus obtained displacement of the robot joint (or, robot joints), strict solutions of displacement of remaining joints of the robot are so derived as to satisfy the above described parameter values of the end effecting point to be accurately controlled.

In arc welding task using a robot, for example, the position of an end effector, i.e., a welding torch and the orientation of the principal axis of the end effector must be accurately controlled. For an amount of rotation around the main axis line of the end effector, an error of some degree can be permitted since the rotational amount does not affect the welding task. Further, in case of usual welding task, for example, it is considered that the orientation of the welding torch exerts less influence upon the work quality than the position of the welding torch. In case of spot welding work as well, it is important to perform welding accurately at a specified position, and an error of some degree in orientation of a spot welding gun is allowable.

In case of fitting assembling task in which the completion of the task is judged while detecting the insertion force, for example, it becomes more important to accurately control the effecting pose than the position (component) of the insertion direction.

When a robot is to perform a task, it is thus usually possible to select at least one parameter exerting less influence upon the quality of the task. Therefore, it is regarded as a sufficiently realistic technique to separate a plurality of parameters indicating the position and orientation of an end effecting point of a robot into parameters to be accurately controlled and parameters allowing errors of some degree.

DESCRIPTION OF THE PREFERRED EMBODIMENTS

Figure 1:
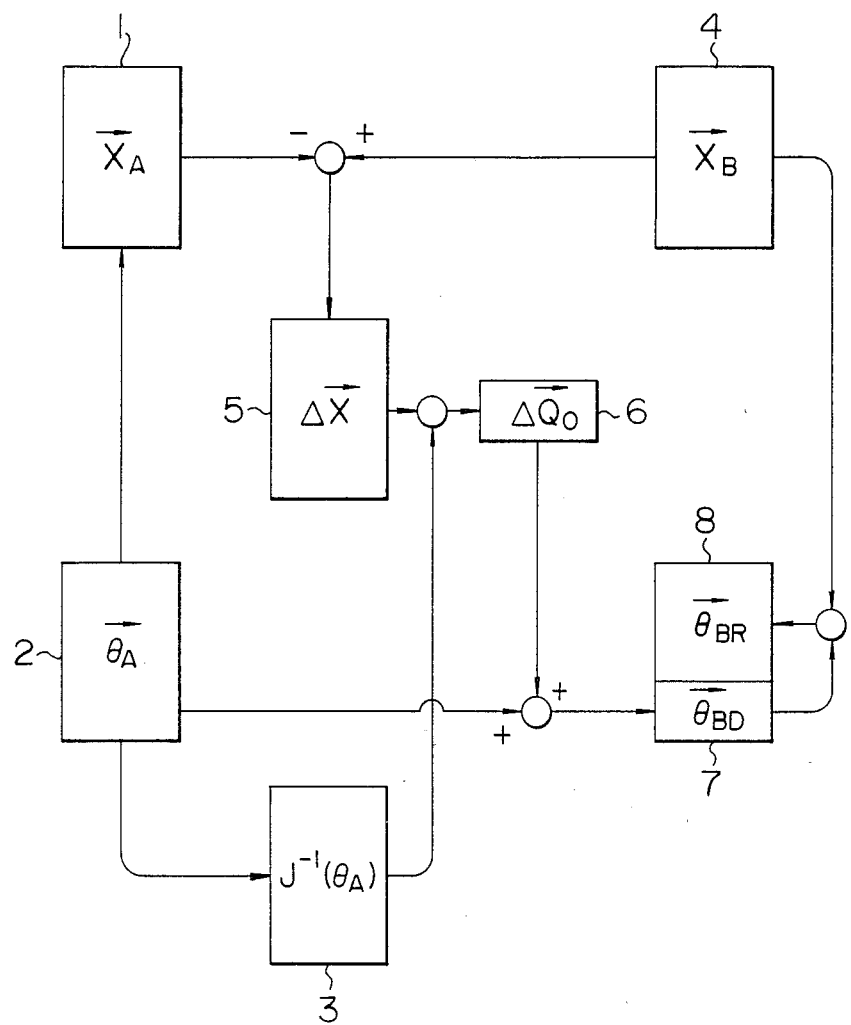
FIG. 1 is a flow chart of control processing showing the concept of the present invention.

Prior to description of embodiment of the present invention, the principle of a control method of the present invention which has been described in "SUMMARY OF THE INVENTION" will be described more concretely.

In case of a robot having 6 degrees of freedom (i.e., a robot having 6 joints), the relation of the expression (10) is represented as $$\Delta \theta_i \approx J^{-1}(\vec{\theta}) \Delta \vec{X} \quad (15)$$

$$(i=1, 2, \ldots, 6)$$

That is to say, 6 sets of expressions are obtained. Letting $\vec{X}_A$ be a vector indicating the position and orientation of the end effecting point of the robot at certain time (which can be represented by 6 independent parameters) and $\vec{X}_B$ be a desired vector of position and orientation of the end effecting point of the robot, it follows that $$\Delta \theta_i \approx J^{-1}(\vec{\theta}_A{}^*)(\vec{X}_B - \vec{X}_A) \quad (16)$$

$$(i=1, 2, \ldots, 6)$$

where $\vec{\theta}_A{}^*$ is $\vec{\theta}_A$ or $\vec{\theta}$ located in the vicinity of $\vec{\theta}_A$, and $\vec{\theta}_A$ is a robot joint displacement vector corresponding to $\vec{X}_A$. It is not assumed that only $\Delta\theta_1$ among 6 sets of expressions represented by the expression (16) is derived by computation, for example. In a robot joint displacement vector $\vec{\theta}_B$ corresponding to $\vec{X}_B$, $\theta_{B1}$ is obtained approximately as $$\theta_{B1} \approx \theta_{A1} + \Delta\theta_1 \quad (17)$$

where $$\vec{\theta}_A = (\theta_{A1}, \theta_{A2}, \ldots, \theta_{A6})^T$$

$$\vec{\theta}_B = (\theta_{B1}, \theta_{B2}, \ldots, \theta_{B6})^T.$$

The relation of the expression (2) will now be reviewed again. The expression (2) is now represented as $$\theta_i = f^{-1}(X_1, X_2, \ldots, X_6) \quad (18)$$

$$(i=1, 2, \ldots, 6).$$

To be concrete, the expression (18) can be rewritten as $$\theta_1 = f_1{}^{-1}(X_1, X_2, \ldots, X_6) \quad (19)$$

$$\theta_2 = f_2{}^{-1}(X_1, X_2, \ldots, X_6) \quad (20)$$

$$\theta_3 = f_3{}^{-1}(X_1, X_2, \ldots, X_6) \quad (21)$$

$$\theta_4 = f_4{}^{-1}(X_1, X_2, \ldots, X_6) \quad (22)$$

$$\theta_5 = f_5{}^{-1}(X_1, X_2, \ldots, X_6) \quad (23)$$

$$\theta_6 = f_6{}^{-1}(X_1, X_2, \ldots, X_6) \quad (24)$$

Even if this $f_i{}^{-1}$ ($i=1, 2, \ldots, 6$) has a form which cannot be analytically solved as it is, five unknown quantities $\theta_2, \theta_3, \theta_4, \theta_5$ and $\theta_6$ remain provided that the value of $\theta_1$ is fixed by the above described expression (17). For a five-dimensional vector with one parameter out of $X_1, X_2, X_3, X_4, X_5$ and $X_6$ removed, such as a vector with $X_2$ removed as $$\vec{X}^* = (X_1, X_3, X_4, X_5, X_6)^T, \quad (25)$$

it is not necessary difficult to derive $$\vec{\theta}^* = (\theta_2, \theta_3, \theta_4, \theta_5, \theta_6)^T \quad (26)$$

corresponding thereto. Its concrete technique will be described later. Conversely speaking, however, the purpose is attained by selecting elements to be removed respectively from $\vec{X}$ and $\vec{\theta}$ so that function $f^{*-1}$ indicated in relationship between the vector $\vec{X}^*$ reduced in dimension by removing at least one element out of $\vec{X}$ and the vector $\vec{\theta}^*$ reduced in dimension similarly by removing at least one element out of $\vec{\theta}$, i.e., function $f^{*-1}$ indicated in the relation $$\vec{\theta}^* = f^{*-1}(X) \quad (27)$$

may be obtained as an analytical strict solution. The dimension of the vector $\vec{X}^*$ is so selected as to coincide with that of $\theta^*$. If the dimension of a vector is increased by one, the time required for calculation of "expression of inverse kinematics" $f^{-1}$ increases in the manner of geometric progression. For robot mechanism having 6 degrees of freedom, it is possible in most cases to obtain an analytic solution by only reducing the degree of the vector by one to obtain a five-dimensional vector. In this connection, instead of the generalized coordinates describing the position and orientation of an end effecting point of a robot to be mentioned in the explanation of the embodiment, absolute coordinates having an origin at one point outside the robot may be used.

An embodiment of the present invention will now be described by referring to FIGS. 1 to 5.

FIG. 1 shows the concept of the present invention. General coordinate system representation 1 of the position and orientation of the end effecting point of a robot at certain time (such as at the present time) is obtained from each joint displacement 2 of the robot at this time by direct kinematics as represented by the expression (1). Further, elements of a Jacobian matrix 3 at this time can be calculated similarly by using displacement of each joint of the robot. It is then assumed that desired values 4 of the position and orientation of the end effecting point of the robot represented by the generalized coordinate system is given. These desired values are, so to speak, command values supplied momentarily at a period of approximately several times to several hundred times per second, for example, to attain the operation control of the robot. The main object of the present invention is directed to a case where the displacement of each joint of the robot cannot be computed accurately even if the desired values 4 of the position and orientation of the end effecting point of the robot is given. At this time, deviation values 5 between the desired values 4 of the end position and orientation and the actual values 1 of the end position and orientation are derived. Since a displacement command to a servo system for driving each joint of the robot is outputted and updated at a period of several times to several hundred times per second as described above, the above described deviation 5 ($\Delta \vec{X}$) can be regarded as a minute amount in most cases. Since the Jacobian matrix 3 is already known, a displacement difference 6 ($\Delta \theta_i$) with respect to at least one of the robot joint displacement values is derived by using the expression (10) or (16). From the displacement difference 6 and the actual displacement 2 of each joint of the robot corresponding to the position and orientation of the end effecting point 1, an approximate solution 7 with respect to at least one out of displacement values of the robot joint which should correspond to the desired value 4 is obtained. Finally, from the approximate solution 7 and the desired values 4 of the position and orientation of the end effecting point, displacement values 8 of remaining unknown robot joints are derived as strict solutions by an algebraic or a geometrical method, for example. At this time, computation may be performed in disregard of at least one out of a plurality of parameters representing the desired values 4, i.e., at least one parameter allowing an error among the position and orientation of the end effecting point. By the procedure heretofore described, all displacement values of respective joints of the robot corresponding to the desired values 4 of the end effecting point are fixed. The function equivalent to the "computation of inverse kinematics" can thus be realized.

Figure 3:
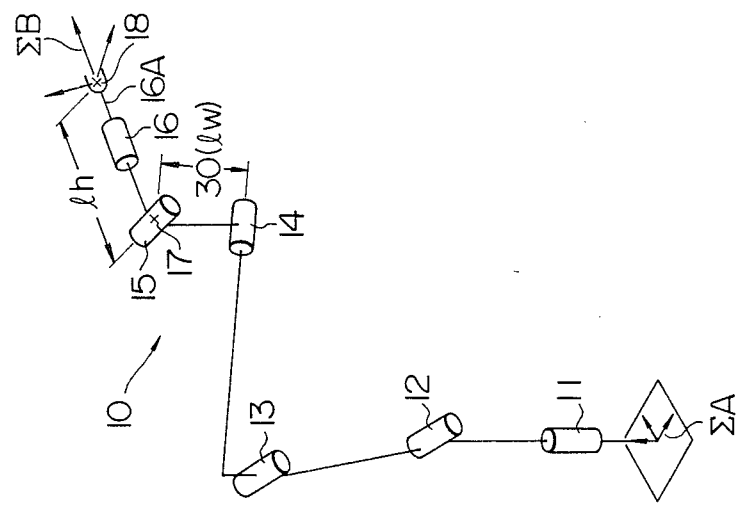
FIG. 3 is a mechanism configuration diagram showing joint arrangement of the robot mechanism illustrated in FIG. 2.
Figure 2:
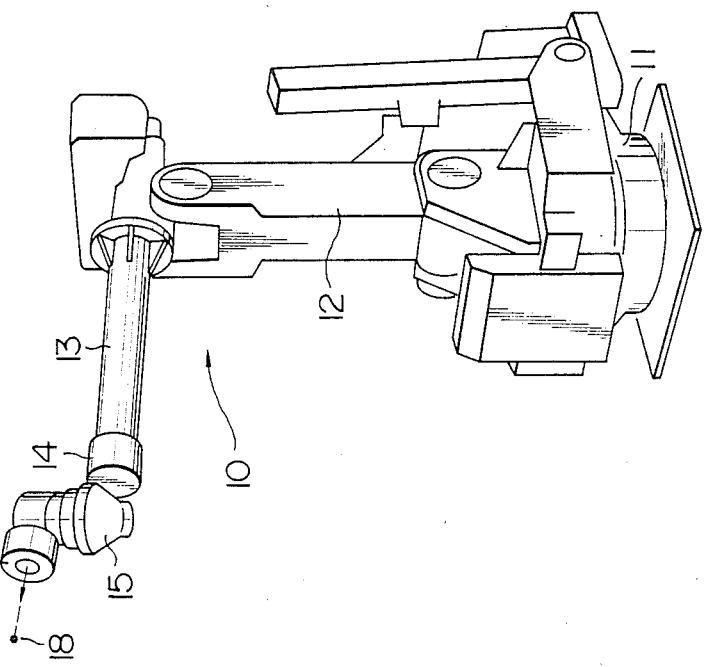
FIG. 2 is an exterior view showing an example of robot mechanism to which a method of the present invention is applied.

FIG. 2 shows an example of robot mechanism whereto the present invention is applied. FIG. 3 is a skeleton view so configured that the arrangement of joints of this robot mechanism may be easily understood. In this example, mechanism 10 is a so-called vertical multi-joint type robot. Beyond three axes comprising a waist axis 11, an upper arm axis 12 and a forearm axis 13, the mechanism 10 further includes three axes relating to the wrist comprising a rotation axis 14 moved around forearm, a bending axis 15 moved around an axis perpendicular to the rotation axis 14, and a twist axis 16 moved around an axis perpendicular to the bending axis 15. That is to say, the mechanism 10 comprises six joints in total. Further, an end effector 17 is attached to the twist axis 16. A feature of this mechanical structure is that the rotation axis 14 and the bending axis 15 do not have a crossing point. At this time, the space distance 30 between the rotation axis 14 and the bending axis 15 is called offset amount.

It is now assumed that displacement values of respective joints of the robot, i.e., displacement values of the waist axis 11, the upper arm axis 12, the forearm axis 13, the rotation axis 14, the bending axis 15 and the twist axis 16 are $\theta_1$, $\theta_2$, $\theta_3$, $\theta_4$, $\theta_5$ and $\theta_6$, resepctively, and that $\theta$ is $$\vec{\theta} = (\theta_1, \theta_2, \theta_3, \theta_4, \theta_5, \theta_6)^T \tag{28}$$

At this time, respective link lengths, offset lengths and twist (i.e. torsion) angles between joints are represented in accordance with the above described notation of Denavit and Hartenberg as listed below.

TABLE 1

| No. | Twist angle $\alpha$ | Offset length $a$ | Link length $d$ |
| --- | --- | --- | --- |
| 1 | $\frac{\pi}{2}$ | 0 | $l_o$ |
| 2 | 0 | $l_1$ | 0 |
| 3 | $\frac{\pi}{2}$ | $l_s$ | 0 |
| 4 | $-\frac{\pi}{2}$ | 0 | $l_2$ |
| 5 | $\frac{\pi}{2}$ | 0 | $l_w$ |
| 6 | 0 | 0 | $l_h$ |

For brevity, it is assumed that an end effecting point 18 is located on the main axis 16A of the twist axis 16 and at a distance $l_h$ from a crossing point 17 of the twist axis 16 and the bending axis 15. Letting the maxin axis 16A of the twist axis 16 be $x_h$ and defining a $y_h$ axis on a movable member of the twist axis in a direction perpendicular to the main axis 16A, the orientation is represented by using directional cosine (component) of unit vectors on the $x_h$ and $y_h$ axes with respect to a reference coordinate system $\Sigma A$. It is now assumed that the reference coordinate system $\Sigma A$ is a coordinate system fixed on the base stand of the robot.

Let us derive the position and orientation of an end effecting point of the robot by using the expression (28) and the parameters shown in Table 1. Assuming a transformation matrix with respect to one joint $\theta_i$ is $A_i$, we get $$A_1 = \begin{bmatrix} C_1 & 0 & S_1 & 0 \\ S_1 & 0 & -C_1 & 0 \\ 0 & 1 & 0 & l_o \\ 0 & 0 & 0 & 1 \end{bmatrix} \tag{29}$$

$$A_2 = \begin{bmatrix} C_2 & -S_2 & 0 & l_1 C_2 \\ S_2 & C_2 & 0 & l_1 C_2 \\ 0 & 0 & 1 & 0 \\ 0 & 0 & 0 & 1 \end{bmatrix} \tag{30}$$

$$A_3 = \begin{bmatrix} C_3 & 0 & S_3 & l_s C_3 \\ S_3 & 0 & -C_3 & l_s S_3 \\ 0 & 1 & 0 & 0 \\ 0 & 0 & 0 & 1 \end{bmatrix} \tag{31}$$

$$A_4 = \begin{bmatrix} C_4 & 0 & -S_4 & 0 \\ S_4 & 0 & C_4 & 0 \\ 0 & -1 & 0 & l_2 \\ 0 & 0 & 0 & 1 \end{bmatrix} \tag{32}$$

-continued $$A_5 = \begin{bmatrix} C_5 & 0 & S_5 & 0 \\ S_5 & 0 & -C_5 & 0 \\ 0 & 1 & 0 & l_W \\ 0 & 0 & 0 & 1 \end{bmatrix} \quad (33)$$

$$A_6 = \begin{bmatrix} C_6 & -S_6 & 0 & 0 \\ S_6 & C_6 & 0 & 0 \\ 0 & 0 & 1 & l_h \\ 0 & 0 & 0 & 1 \end{bmatrix} \quad (34)$$

where
$S_i = \sin \theta_i$
$C_i = \cos \theta_i$

A matrix T for transformation from the reference coordinate system $\Sigma A$ to an end effector coordinate system $\Sigma B$ having axes $x_h$ and $y_h$ as two of main axes is derived as $$T = A_1 A_2 A_3 A_4 A_5 A_6. \quad (35)$$

Letting $$T = \begin{bmatrix} n_x & o_x & a_x & p_x \\ n_y & o_y & a_y & p_y \\ n_z & o_z & a_z & p_z \\ 0 & 0 & 0 & 1 \end{bmatrix} \quad (36)$$

the position of the end effecting point is represented by components of the reference coordinate system $\Sigma A$ as ($p_x$, $p_y$, $p_z$).

Further, the orientation of the end effecting point, i.e., the directional cosine of the $x_h$ and $y_h$ axes become ($a_x$, $a_y$, $a_z$) and ($n_x$, $n_y$, $n_z$), respectively. Comparing these with the expression (35), we get $$P_x = C_1[C_2 l_1 + S_{23} l_2^* + C_{23} l_S^*] + S_1 l_W^* \quad (37)$$

$$P_y = S_1[C_2 l_1 + S_{23} l_2^* + C_{23} l_S^*] - C_1 l_W^* \quad (38)$$

$$P_z = S_2 l_1 - C_{23} l_2^* + S_{23} l_5^* + l_0 \quad (39)$$

where $C_{23} = \cos(\theta_2 + \theta_3)$ $S_{23} = \sin(\theta_2 + \theta_3)$ $l_2^* = l_2 + C_2 l_h$ $l_S^* = l_S - S_4 l_W + C_4 S_5 l_h$ $l_W^* = C_4 l_W + S_4 S_5 l_h.$ Further, we get $$n_x = C_1(C_{23}(C_4 C_5 C_6 - S_4 S_6) - S_{23} S_5 C_6) + S_1(S_4 C_5 C_6 - C_4 S_6) \quad (40)$$

$$n_y = S_1(C_{23}(C_4 C_5 C_6 - S_4 S_6) - S_{23} S_5 C_6) - C_1(S_4 C_5 C_6 + C_4 S_6) \quad (41)$$

$$n_z = S_{23}(C_4 C_5 C_6 - S_4 S_6) + C_{22} S_5 - C_6 \quad (42)$$

$$a_x = C_1(C_{23} C_4 S_5 + S_{23} C_5) + S_1 S_4 S_5 \quad (43)$$

$$a_y = S_1(C_{23} C_4 S_5 + S_{23} C_5) - C_1 S_4 S_5 \quad (44)$$

$$a_z = S_{23} C_4 C_5 - C_{23} C_5. \quad (45)$$

Letting $\vec{n} = (n_x, n_y, n_z)^T$, $\vec{o} = (o_x, o_y, o_z)^T$, $\vec{a} = (a_x, a_y, a_z)^T$, we get $\vec{o} = \vec{a} \times \vec{n}$ (outer product). The expressions (37) to (45) correspond to the actual form of expressions of "direct kinematics" from the displacement vector $\vec{\theta}$ of each joint of the robot to the position and orientation of the end effecting point. Although nine expressions are shown here, the number of independent variables is 6 because of orthogonal conditions between $\vec{n}$, $\vec{o}$ and $\vec{a}$ as well as condition for unit vectors. This indicates that it is generally possible to control the position and orientation of the end effecting point 18 in the three-dimensional space by using the six joints $\theta_1$ to $\theta_6$ possessed by the robot mechanism 10. In the singular configuration in which the Jacobian determinant becomes zero as described before, the degree of freedom of the robot 10 degenerates (i.e., effective degrees of freedom reduce) and hence it becomes impossible to control the position and orientation of the end effecting point 18.

For attaining operation while controlling the position and orientation of the end effecting point 18 of the robot 10, it is necessary to derive momently $\theta_1$ to $\theta_6$ satisfying $P_x$, $P_y$, $P_z$, $n_x$, $n_y$, $n_z$, $a_x$, $a_y$ and $a_z$ given by the expressions (37) to (45) and servocontrol the displacement of each joint. Therefore, expressions obtained by inversely solving the expressions (37) to (45), i.e., s-called "expressions of inverse kinematics" must be derived.

In case of a mechanism structure of the present robot, however, it is extremely difficult to derive expressions of inverse kinematics with respect to the expressions (37) to (45). If it is attempted to derive those expressions algebraically, for example, problems such as high degrees of equations are caused. If it is attempted to derive those expressions geometrically, it is easy as far as the stage for deriving the position coordinate value of the crossing point 18 of the twist axis 16 and the bending axis 15 from the position of the end effecting point by paying attention to components of the vector $\vec{a}$ and the distance h. However, it is difficult to retrospectively derive the position of the rotation axis 14 or the position of the end of the forearm 13.

Figure 4:
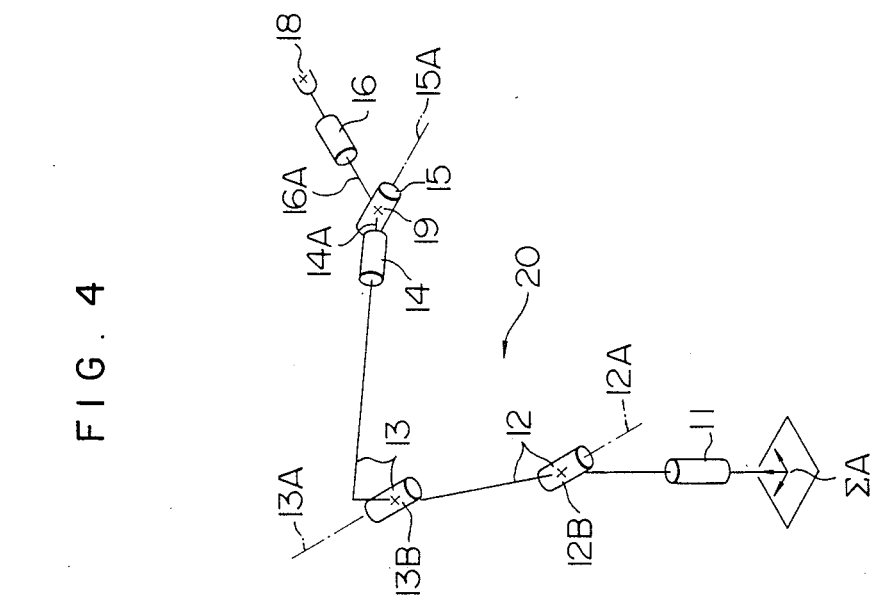
FIG. 4 is a mechanism configuration diagram showing an example of robot mechanism to which the prior art can be applied.

Even if mechanism configuration is almost the same as that of the robot mechanism as robot mechanism 20 illustrated in FIG. 4, expressions of the inverse kinematics can be derived comparatively easily when the space distance between the rotation axis 14 and the bending axis 15, i.e., the offset amount 30 is zero. Because the main axis 14A of the rotation axis 14, the main axis 15A of the bending axis 15 and the main axis 16A of the twist axis 16 always intersect at one point 19 in this case. To be concrete, in this case the expressions (37) to (39) can be rewritten as $$P_x = C_1[C_2 l_1 + S_{23} l_2^* + C_{23} l_S^{**}] + S_1 S_4 S_5 l_h \quad (37)'$$

$$P_y = S_1[C_2 l_1 + S_{23} l_2^* + C_{23} l_S^{**}] - C_1 S_4 S_5 \, h \quad (38)'$$

$$p_z = S_2 l_1 - C_{23} l_2^* + S_{23} l_S^{**} + l_o \quad (39)'$$

where $$l_S^{**} = l_S + C_4 S_5 l_h.$$

There are no amendments for the expressions (40) to (45). At this time, the position ($Q_x$, $Q_y$, $Q_z$) of the point 19 is first derived as $$Q_x = P_x - a_x h \quad (46)$$

$$Q_y = P_y - a_y h \quad (47)$$

$$Q_z = P_z - a_z h \quad (48)$$

Further, from geometrical relationship, it evidently follows that $$\theta_1 = \tan^{-1} \frac{Q_y}{Q_x}. \quad (49)$$

Letting the angle formed by a straight line drawn from a rotation center 12B of the upper arm 12 (the main axis 12A) to the point 19 of the wrist and the x-y plane of the reference coordinate system $\Sigma A$ be $\theta_c$, we get $$\theta_c = \tan^{-1} \frac{Q_z}{\sqrt{Q_x^2 + Q_y^2}}. \quad (50)$$

By applying the cosine theorem to a triangle formed by the point 12B, the point 19 and a point 13B, where the point 13B is a crossing point of the forearm axis 13A and a plane including the upper arm 12 and the forearm 13, there results $$\theta_2 = \theta_c \pm \cos^{-1} \frac{L^2 + l_1^2 - l_{2s}^2}{2 L l_1} \quad (51)$$

where $L = \sqrt{Q_x^2 + Q_y^2 + Q_z^2}$ (52)

$$l_{2S} = \sqrt{l_2^2 + l_S^2}. \quad (53)$$

Likewise, we get $$\theta_3 = \cos^{-1} \frac{l_1^2 + l_{2S}^2 + L^2}{2 l_1 l_{2S}} - \pi - \phi \quad (54)$$

where $$\phi = \tan^{-1} \frac{l_S}{l_2} \quad (55)$$

or $\theta_3$ can be represented as $$\theta_3 = \tan^{-1} \frac{Q_z - S_2 l_1}{\sqrt{Q_x^2 + Q_y^2} - C_2 l_1} - \theta_2 - \phi. \quad (54)'$$

In this way, $\theta_1$, $\theta_2$ and $\theta_3$ and be derived.

Further, $\theta_4$ has two solutions as $$\theta_4 = \begin{bmatrix} = \tan^{-1} \dfrac{S_1 a_x - C_1 a_y}{C_{23}(C_1 a_x + S_1 a_y) + S_{23} a_z} \\ = \tan^{-1} \dfrac{-(S_1 a_x - C_1 a_y)}{-(C_{23}(C_1 a_x + S_1 a_y) + S_{23} a_z)} \end{bmatrix} \quad (56)$$

Further, we get $$\theta_5 = \tan^{-1} \frac{C_4(C_{23}(C_1 a_x + S_1 a_y) + S_{23} a_z)}{S_{23}(C_1 a_x + S_1 a_y) - C_{23} a_z} \quad (57)$$

$$\theta_6 = \tan^{-1} \frac{C_4(S_1 n_x C_1 n_y) - S_4(C_{23}(C_1 n_x + S_1 n_y) + S_{23} n_z)}{C_5(C_4(C_{23}(C_1 n_x + S_1 n_y) + S_{23} n_z) + S_4(S_1 n_x - C_1 n_y)) - S_5(S_{23}(C_1 n_x + S_1 n_y) - C_{23} n_z)} \quad (58)$$

It is thus understood that "expressions of inverse kinematics" can be derived as analytical solutions for a robot having mechanism configuration as shown in FIG. 4.

Returning now to the original problem, "expressions of inverse kinematics" as represented by the expressions (46) to (58) cannot be derived for the robot mechanism 10 as shown in FIGS. 2 and 3. Therefore, it becomes necessary to use a method employing a Jocobian matrix as described before. The Jacobian matrix of the present robot mechanism 10 becomes as represented later by the expression (62), where $V_x$, $V_y$ and $V_z$ denote components of the linear velocity of the end effecting point respectively in the x, y and z axis directions of the end coordinate system $\Sigma B$, and $W_x$, $W_y$, $W_y$ and $W_z$ similarly denote compoents of the rotation velocity of the end effecting orientation (the end coordinate system $\Sigma B$ itself) respectively around the x, y and z axes of the end coordinate system $\Sigma B$.

Evidently, we have $$V_x = n_x \frac{dP_x}{dt} + n_y \frac{dP_y}{dt} + n_z \frac{dP_z}{dt} \quad (59\text{-}1)$$

$$V_y = o_x \frac{dP_x}{dt} + o_y \frac{dP_y}{dt} + o_z \frac{dP_z}{DT} \quad (59\text{-}2)$$

$$V_z = a_x \frac{dP_x}{dt} + a_y \frac{dP_y}{dt} + a_z \frac{dP_z}{dt}. \quad (59\text{-}3)$$

The representation of rotation velocity components $W_x$, $W_y$ and $W_z$ by the reference coordinate system $\Sigma A$ is related to their representation by the end coordinate system $\Sigma B$ in the same way.

Further, we have $$\lambda_i = \frac{d\theta_i}{dt} \quad (i = 1, 2, \ldots, 6) \quad (60)$$

$$\begin{bmatrix} V_x \\ V_y \\ V_z \\ W_x \\ W_y \\ W_z \end{bmatrix} = j(\theta) \begin{bmatrix} \lambda_1 \\ \lambda_2 \\ \lambda_3 \\ \lambda_4 \\ \lambda_5 \\ \lambda_6 \end{bmatrix} \quad (61)$$

$$J(\theta) = \begin{bmatrix} J_{11} & J_{12} & J_{13} & -C_5C_6l_{10} & 0 & 0 \\ J_{21} & J_{22} & J_{23} & C_5S_6l_w & 0 & 0 \\ J_{31} & J_{32} & J_{33} & -S_5l_w & 0 & 0 \\ J_{41} & J_{42} & J_{42} & -S_5C_6 & S_6 & 0 \\ J_{51} & J_{52} & J_{52} & S_5C_6 & C_6 & 0 \\ J_{61} & S_4S_5 & S_4S_5 & C_5 & 0 & 1 \end{bmatrix}$$ (62)

where
$J_{11} = -R(S_4C_5C_6+C_4S_6)+C_4l_w(C_{23}(C_4C_5C_6-S_4S_6)-S_{23}S_5C_6)$ $J_{21} = -R(-S_4C_5C_6+C_4S_6)+C_4l_w(C_{23}(-C_4C_5C_6-S_4S_6)+S_{23}S_5C_6)$ $J_{31} = -RS_4S_5+C_4l_w(C_{23}C_4S_5+S_{23}C_5)$ $J_{41} = S_{23}(C_4C_5C_6-S_4S_6)+S_{23}S_5C_6$ $J_{51} = S_{23}(-C_4C_5C_6-S_4S_6)-S_{23}S_5C_6$ $J_{61} = S_{23}C_4C_5-C_{23}C_5$ $J_{12} = (S_3(C_4C_5C_6-S_4S_6)+C_3S_5C_6P l_1 + (C_4C_5C_6-S_4S_6)l_2+S_5C_6(l_s-S_4l_w)$ $J_{22} = (S_3(-C_4C_5C_6-S_4S_6)-C_3S_5S_6)l_1 - (C_4C_5S_6+S_4C_6)l_2-S_5S_6(l_s-S_4l_w)$ $J_{32} = (S_3C_4S_5-C_3C_5)l_1+C_4S_5l_2-C_5(l_s-S_4l_w)$ $J_{42} = S_4C_5C_6+C_4S_6$ $J_{52} = -S_4C_5S_6+C_4C_6$ $J_{13} = (C_4C_5C_6-S_4S_6)l_2+S_5C_6(l_s-S_4l_w)$ $J_{23} = (-C_4C_5S_6-S_4C_6)l_2-S_5S_6(l_s-S_4l_w)$ $J_{33} = C_4S_5l_2-C_5(l_s-S_4l_w)$ where
$R = C_2l_1+S_{23}l_2+C_{23}(l_s-S_4l_w)$ Further, for brevity, we have let $l_o=l_h=0$. (This does not change the essense of the problem, that is to say, $l_o$ causes only the parallel shift of the origin of the generalized coordinate system. As for the influence of $l_h$, it is possible to derive the position Q* of the crossing point of the twist axis 16 and the bending axis 15 immediately from the end position and orientation by letting $h=l_h$ in the expressions (46) to (48). If the velocity and angular velocity at the actual end effecting point 18 is transformed to the velocity and angular velocity at the above described point Q*, the above described expression (62) can be applied as it is. In the examples of FIGS. 2 and 3, the end effecting point 18 is defined to be on the twist axis 16. If the relative relation with respect to the point Q* is already known, however, the end effecting point 18 can be set at an arbitrary point similarly to the above description.)

$$\vec{\lambda} = (\lambda_1, \lambda_2, \lambda_3, \lambda_4, \lambda_5, \lambda_6)^T \tag{63}$$

$$\vec{v} = (V_x, V_y, V_z, W_x, W_y, W_z)^T, \tag{64}$$

the Jacobian matrix $J(\vec{\theta})$ is represented as $$\vec{v} = J(\vec{\theta}) \cdot \vec{\lambda}. \tag{65}$$

Therefore, $\vec{\lambda}$ can be derived by the relation $$\vec{\lambda} = J^{-1}(\vec{\theta}) \cdot \vec{v}. \tag{66}$$

However, it is rather complicated to solve this equation without modifying it. In addition, it is not necessary to derive all elements of $\vec{\lambda}$ when the method of the present invention is used. Accordingly, the following technique is used. That is to say, looking at elements of the Jacobian matrix, the Jacobi matrix is so modified that terms relating to elements other than needed elements of $\vec{\lambda}$ may contain as many zeros as possible. Here, "needed elements of $\vec{\lambda}$" refer to elements of $\vec{\lambda}$ which should be derived by using the Jacobian matrix.

In accordance with a feature of the present invention as described before, at least one parameter which need not be controlled accurately and hence at least one parameter allowing an error is selected out of six parameter prescribing the position and orientation of the end effector 17 of the robot at the end effecting point 18, and at least one joint of the robot to be controlled by using an approximate solution derived from the Jacobian matrix in consideration of at least one selected parameter is distinguished from remaining joints of the robot to be controlled by using strict solutions which are so derivedd by using the above described approximate solution as to satisfy parameters to be controlled accurately.

Let's consider application of robots to an certain task in which the required precision for the orientation of the end effector may be lower than the required precision for the path to be traced by the effecting point 18 of the end effector 17. It can be said that this holds true for many tasks using industrial robots such as arc welding task, sealing task, painting task and spot welding task. At this time, the position of the end effecting point 18 of the robot is controlled accurately and orientation of the end effector is controlled roughly to some degree, in other words, allowing an approximation error. When this is considered for joints of the robot, it is possible to consider that the waist axis $\theta_1$, the upper arm $\theta_2$ and the forearm $\theta_3$ are joints for mainly controlling the position of the end effecting point 18 and the rotation $\theta_4$, the bending $\theta_5$ and the twist $\theta_6$ of the wrist are joints for mainly controlling the orientation of the end effector. In a possible method, therefore, $\theta_4$, $\theta_5$ and $\theta_6$ are defined as joint displacement values to be derived as approximate solutions and $\theta_1$, $\theta_2$ and $\theta_3$ are defined as joint displacement values to be derived as strict solutions (with respect to the position of the end effecting point), in view of the above described task specifications.

In this case, it is not advisable to derive an inverse matrix of the Jacobian matrix. Only $\lambda_4$, $\lambda_5$ and $\lambda_6$ respectively corresponding to $\theta_4$, $\theta_5$ and $\theta_6$ need be derived by using only necessary portions. Looking at this fact, the following scheme, for example, is effective. When the Jacobian matrix of the expression (62) is divided in $3 \times 3$ minor matrices as $$J(\theta) = \begin{vmatrix} J_{AL} & J_{AR} \\ J_{BL} & J_{BR} \end{vmatrix}, \tag{62'}$$

they are so transformed in some form that elements in $J_{AL}$ and $J_{BL}$ contain many zeros. If the matrices $J_{AL}$ and $J_{BL}$ can be so transformed that three out of six rows (each of which comprises three elements) contain only elements of zero, three equations relating to $\lambda_4$, $\lambda_5$ and $\lambda_6$ are eventually obtained. By solving the three equations, $\lambda_4$, $\lambda_5$ and $\lambda_6$ are obtained. This procedure is as follows. Letting $\lambda_2^* = \lambda_2 + \lambda_3$ and $$\begin{aligned}
^5V_x &= C_6V_x - S_6V_y \\
^5V_y &= C_6V_x + C_6V_y \\
^5V_z &= V_z \\
^5W_x &= C_6W_x - S_6W_y \\
^5W_y &= S_6W_x + C_6W_y \\
^5W_z &= W_z,
\end{aligned} \quad (67)$$

the expression (6) can be transformed to $$\begin{bmatrix} ^5V_x \\ ^5V_y \\ ^5V_z \\ ^5W_x \\ ^5W_y \\ ^5W_z \end{bmatrix} = \begin{bmatrix} ^5J_{11} & ^5J_{12} & ^5J_{13} & -C_5l_w & 0 & 0 \\ ^5J_{21} & -S_3S_4l_1 & -S_4l_2 & 0 & 0 & 0 \\ ^5J_{31} & ^5J_{32} & ^5J_{33} & -S_5l_w & 0 & 0 \\ ^5J_{41} & 0 & S_4C_5 & -S_5 & 0 & 0 \\ -S_{23}S_4 & 0 & C_4 & 0 & 1 & 0 \\ ^5J_{61} & 0 & S_4S_5 & C_5 & 0 & 1 \end{bmatrix} \begin{bmatrix} \lambda_1 \\ \lambda_2^* \\ \lambda_3 \\ \lambda_4 \\ \lambda_5 \\ \lambda_6 \end{bmatrix} \quad (68)$$

where $^5J_{11} = -RS_4C_5 + C_4l_w(C_{23}C_4C_5 - S_{23}S_5)$ $^5J_{21} = -RC_4 - C_4l_wC_{23}S_4$ $^5J_{31} = -RS_4C_5 + C_4l_w(C_{23}C_4C_5 + S_{23}S_5)$ $^5J_{41} = S_{23}C_4C_5 + C_{23}S_5$ $^5J_{61} = S_{23}C_4C_5 - C_{23}C_5$ $^5J_{12} = (S_3C_4C_5 + C_3S_5)l_1$ $^5J_{32} = (S_3C_4C_5 - C_3S_5)l_1$ $^5J_{13} = C_4C_5l_2 + S_5(l_s - S_4l_w)$ $^5J_{33} = C_4C_5l_2 - S_5(l_s - S_4l_w)$.

This operation corresponds to representation of the velocities of the changing position and changing orientation of the end effector when they are transformed to a coordinate system fixed to a state obtained when the displacement $\theta_6$ of the twist axis 16 is zero, i.e., a coordinate system fixed with respect to the bending axis 15. If the Jacobian matrix is successively transformed by mainly using such a technique, $\lambda_4$, $\lambda_5$ and $\lambda_6$ are obtained finally by using procedure represented as $^4V_z = ^5V_xS_5 - V_zC_5 + l_w(^5W_xC_5 + W_zS_5)$ (69)

$^4W_z = ^5W_xS_5 - W_zC_5$ (70)

$^3W_z = V_x(C_4C_5C_6 - S_4S_6) - V_y(C_4C_5C_6 + S_4C_6) + V_zC_4S_5 - l_wC_4{}^4W_z$ (71)

$^3V_y = V_x(S_4C_5C_6 + C_4S_6) - V_y(S_4C_5S_6 - C_4C_6) + V_zS_4S_5 + l_wS_4({}^5W_xC_5 + W_zS_5)$ (72)

$^3W_x = W_x(C_4C_5C_6 - S_4S_6) - W_y(C_4C_5C_6 + S_4S_6) + W_zC_4S_5$ (73)

$^3W_y = W_x(S_4C_5C_6 + C_4S_6) - W_y(S_4C_5C_6 - C_4S_6) + W_zS_4S_5.$ (74)

Further $A_{11} = 3W_y(l_2C_3 - l_sS_3) - (3V_xC_3 - 4V_zS_3)$ (75)

$A_{21} = (C_2l_1 + S_{23}l_2 + C_{23}l_s) \cdot 3W_x + S_{23} \cdot 3V_y$ (76)

$A_{22} = -(C_2l_1 + S_{23}l_2 + C_{23}l_s) \cdot 4W_z - C_{23} \cdot 3V_y$ (77)

$D_{11} = -S_4(C_2l_1 + S_{23}l_2 + C_{23}l_s)$ (78)

$D_{12} = C_4S_5(C_2l_1 + S_{23}l_2 + C_{23}l_s) + S_{23}S_4C_5l_w$ (79)

$D_{21} = C_4(l_2C_3 - l_sS_3)$ (80)

$D_{22} = S_4S_5(l_2C_3 - l_sS_3) - (C_3C_4C_5 - S_3S_5)l_w$ (81)

$B = D_{11}D_{22} - D_{12}D_{21}.$ (82)

By using these expressions, we get $\lambda_6 = (D_{11}A_{11} - D_{21}A_{21})/B$ (83)

$\lambda_5 = (D_{22}A_{21} - D_{12}A_{11})/B$ (84)

Further, therefrom we get $$\lambda_4 = \frac{A_{22} - \lambda_6(C_5(C_2l_1 + S_{23}l_2 + C_{23}l_s) - C_{23}S_4C_5l_w)}{C_2l_1 + S_{23}l_2 + C_{23}l_s}. \quad (85)$$

That is to say, $\lambda_4$, $\lambda_5$ and $\lambda_6$ have thus been derived.

The expressions (67) to (85) merely show an example of solution. It is a matter of course that they can be represented by various modified forms. In the solution indicated herein, notation such as $^3V_x$ and $^3V_y$ is used. These values correspond to the representation of the velocity of the end effector in a coordinate system fixed on the link 13. (In the present case, the values including sings are not necessarily identical completely because of the modification procedure or other causes.) Therefore, it is understood that the Jacobian matrix can be solved to derive the displacement velocity of joints of the robot mechanism without using the above described form necessarily. For example, by using a coordinate system $\Sigma C$ fixed on the forearm 13 of the robot mechanism 10, a Jacobian matrix providing relationship between the velocity or angular velocity of the represented end effecting point and the displacement velocity of each joint of the robot (i.e., a Jacobin matrix using different representation) is directly derived. Necessary displacement velocities of robot joints can be derived by applying some modification to the Jacobian matrix.

From the position and orientation of the end effecting point 18 of the robot 10 at certain time to and the position and orientation of the end effecting point 18 at time to $+\Delta t$, the difference between them is derived in the form of linear and rotation displacement as components of a coordinate system suitable for representing the above described Jacobian matrix. Regarding them as velocity components, $\lambda_4$, $\lambda_5$ and $\lambda_6$ are derived by the expressions by the expressions (83) to (85). From these values and displacement of the corresponding joint of the robot 10 at time $t_o$, approximate solutions of displacement $\theta_4$, $\theta_5$ and $\theta_6$ of the joints at time $t_o + \Delta t$ are derived. It is now assumed that the desired position of the end effecting point 18 at time $t + \Delta t_o$ is represented by $X_r$, $Y_r$ and $Z_r$ and the reference coordinate system.

By using an approach similar to that taken in connection with expressions (46) to (53), the joint displacement $\theta_1$, $\theta_2$ and $\theta_3$ for accurately satisfying the desired positions $X_r$, $Y_r$ and $Z_r$ are derived as $$l_{2D} = l_2 + C_5 l_h \tag{86}$$

$$l_{SD} = l_5 - S_4 l_w + S_4 S_5 l_h \tag{87}$$

$$l_{WD} = C_4 l_w + S_4 S_5 l_h \tag{88}$$

$$R_M = \sqrt{X_r^2 + Y_r^2 - l_{wD}^2} \tag{89}$$

$$L_M = \sqrt{R_M^2 + Z_r^2} \tag{90}$$

$$l_{2SD} = \sqrt{l_{2D}^2 + l_{SD}^2} \tag{91}$$

$$\theta_1 = \tan^{-1}\frac{Y_r}{X_r} + \tan^{-1}\frac{l_{WD}}{R_M} \tag{92}$$

$$\theta_2 = \cos^{-1}\frac{L_M + {}^2 l_1 - {}^2 l_{2SD}^2}{2 L_M l_1} + \tan^{-1}\frac{Z_r}{R_M} \tag{93}$$

$$\theta_3 = \cos^{-1}\frac{l_1^2 + l_{2SD}^2 - L_M^2}{2 l_1 l_{2SD}} - \tan^{-1}\frac{l_{SD}}{l_{2D}} - \frac{\pi}{2}. \tag{94}$$

In the above solutions, as for $\theta_2$ and $\theta_3$, solutions in case where the position of the forearm axis 13 is above the straight line connecting the upper arm axis 12 and the end effecting point 18 are shown.

There has heretofore been described an embodiment of a computational control scheme using a Jacobian matrix according to the present invention for accurately providing a desired position and for defining a desired displacement value of each robot joint with an approximation error for orientation on the basis of the desired position and orientation of the end effecting point 18 and the state (such as the joint displacement and the position and orientation of the end effecting point), i.e., for performing the function of the so-called "inverse kinematics".

Assuming that an error of some degree is allowed with respect to the orientation among the position and orientation of the end effecting point 18 in the present embodiment, approximate solutions using the Jacobian matrix are derived with respect to $\theta_4$, $\theta_5$ and $\theta_6$ among joint displacement values of the robot, and strict solutions for accurately satisfying the position of the end effecting point 18 are derived with respect to $\theta_1$, $\theta_2$ and $\theta_3$, the robot being controlled by the resultant solutions. Alternatively, only $\theta_6$ may be derived as an approximate solution by using the Jacobian matrix while deriving $\theta_1$ to $\theta_5$ as strict solutions, for example. It is a matter of course that joints to which approximate solutions are to be applied and the number of such joints can thus be selected arbitrarily. Further in a version, only the orientation of the end effecting point 18 is controlled accurately and an approximation error may be allowed for the position. Further, it is a matter of course that there is a version in which an arbitrary number of parameters such as five parameters, four parameters, three parameters, two parameters or one parameter among six parameters providing the position and orientation of the end effecting point 18 are accurately controlled while approximation errors are allowed for remaining parameters.

In the present embodiment, joints of the robot to be solved approximately were always defined to be $\theta_4$, $\theta_5$ and $\theta_6$. In an alternative embodiment, however, joints of the robot to be solved approximately are so selected each time in accordance with the state of the robot that the position and orientation parameters of the end effecting point 18 to be controlled accurately may be satisfied while the influence exerted upon the remaining parameters allowing errors may be minimized, in other words, errors of the parameters allowing errors may also be reduced as far as possible. In the present embodiment, approximate solutions are derived on the basis of the Jacobian matrix using the current state of the robot, i.e., the Jacobian matrix using respective joint displacement values of the robot obtained immediately before proceeding to a desired operation point. In a possible version, however, a set of joint displacement values of the robot providing approximate solutions with less errors are presumed and used. In another version, values of respective elements of the Jacobian matrix at representative points of the operation regions of the robot divided into a number of some degree are derived and stored in a Table beforehand, and approximate solutions are derived more simply by applying linear interpolation to the Table, for example, instead of computing the Jacobian matrix each time.

In the foregoing description, the robot mechanism 10 illustrated in FIGS. 2 and 3 was taken as an example of robot mechanism. It is a matter of course that the scheme of the present invention is not limited to this example, but may be applied to a robot having arbitrary mechanism configuration. This holds true in case the number of degrees of freedom (or joints) possessed by the robot, for example, is different from six indicated in the present embodiment as well.

An example of apparatus configuration for actually performing the operation control of a robot by using the method of the present invention will now be described.

Figure 5:
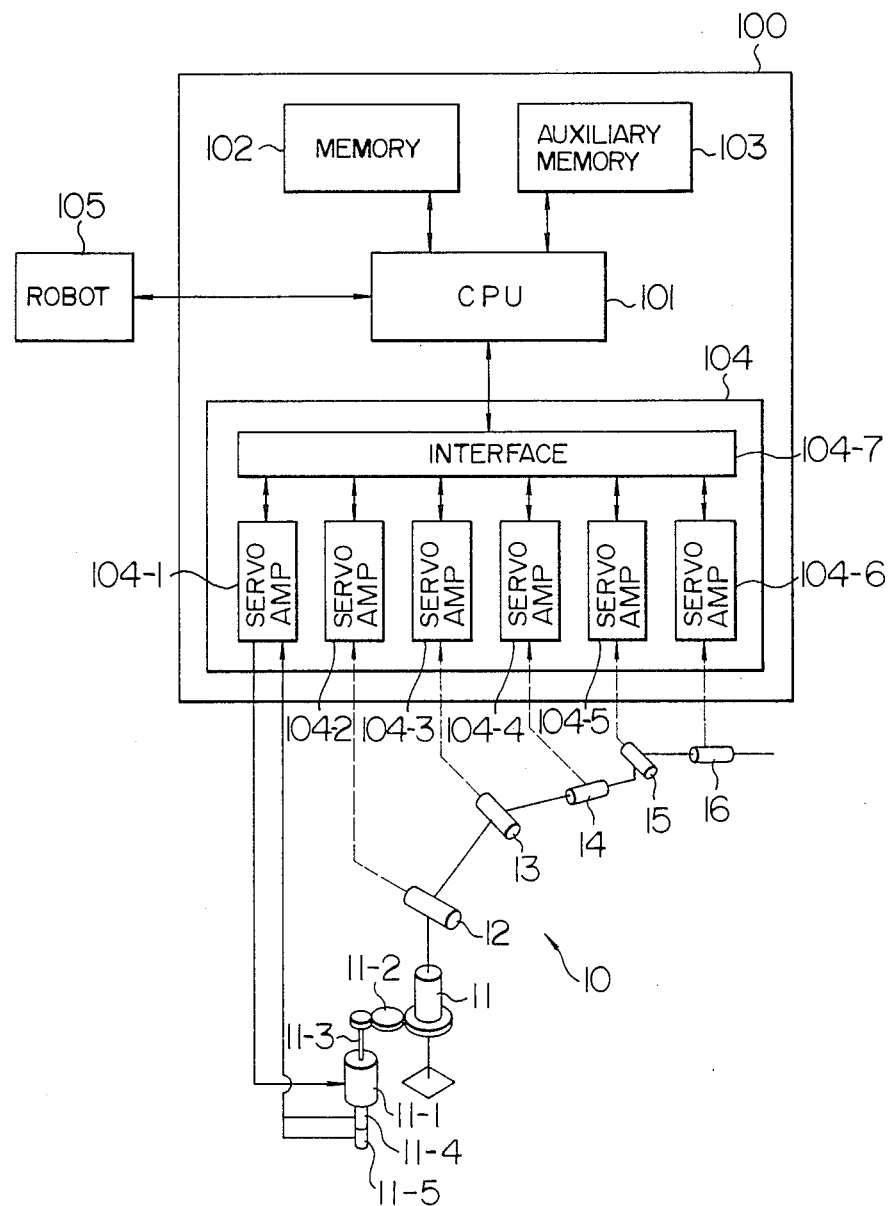
FIG. 5 shows the entire configuration of a robot system to which a method of the present invention is applied and shows the configuration of its control unit.

FIG. 5 shows the entire configuration of a robot system and the internal configuration of a control unit. The robot 10 is controlled by a control unit 100. The control unit 100 mainly comprises a central computation processing unit 101, a memory unit 102, an auxiliary memory unit 103; a servo amplifier 104 and a operation unit 105. As the central processing unit 101, a microprocessor is typically used. The servo amplifier 104 includes uniaxial servo amplifiers 104-1 to 104-6 for performing the position control of respective joints of the robot and an interface section 104-7. The amplifiers 104-1 to 104-6 have identical configuration. The drive system of one joint (such as the waist rotation axis 11) of the robot 10 will now be further described by taking the servo amplifier 104-1 as an example. The joint 11 of the robot 10 comprises a motor 11-1 and velocity reduction mechanism 11-2. Signals supplied from a velocity detector 11-4 and a position detector 11-5 coupled to a rotation axis 11-3 of the motor are applied to the servo amplifier 104-1. And the output of the servo amplifier, i.e., a drive command is supplied to the motor. As described before, drive systems of other joints of the robot 10 are configured similarly to the joint 11 (i.e., waist rotation axis).

Figure 6:
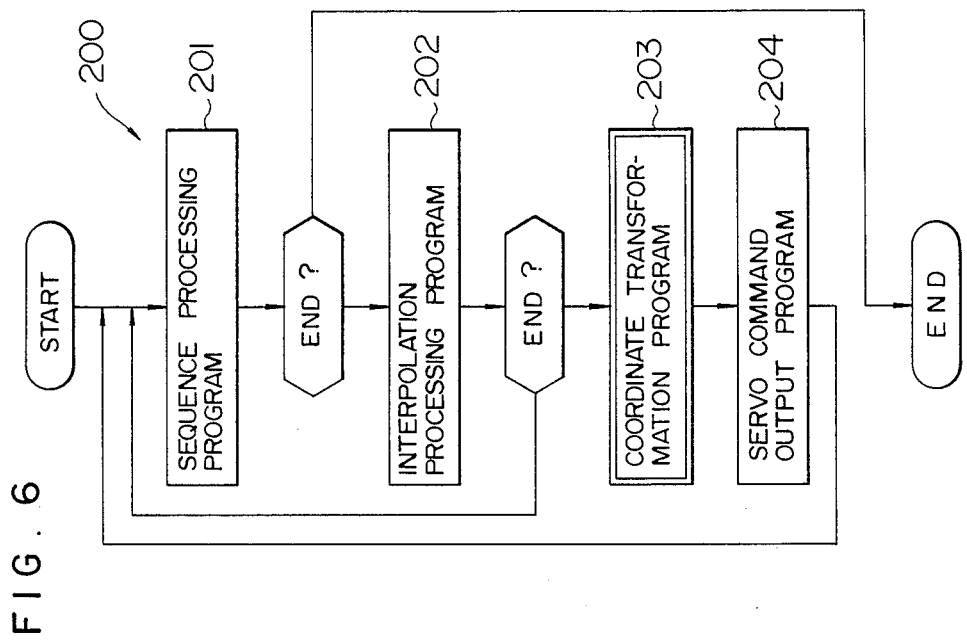
FIG. 6 is a flow chart of control processing performed in a control processing unit illustrated in FIG. 5.

FIG. 6 shows the outline of control processing program 200 used in the central processing unit 101 illustrated in FIG. 5. This processing program 200 is stored in the memory unit 102. Position and orientation data groups for providing the operation locus of the robot are stored in the auxiliary memory unit 103.

These position and orientation data groups can be supplied by teaching or numerical data input using off-line programming, for example.

The control processing program 200 includes sequence processing program 201, interpolation processing program 202, coordinate transformation program 203 and servo command output program 204. In the coordinate tramsformation program 203, the scheme of the present invention, i.e., processing procedure having contents illustrated in FIG. 1 is described or implemented.

The actual control procedure will now be described by referring to FIGS. 5 and 6.

It is now assumed that the end effecting point of the robot 10 has position and orientation $P_o$ (represented in a form similar to that of $\vec{X}$ of the expression (3)) at the present time.

First of all, the control processing program 200 is started in the control unit 100, and the sequence processing program 201 is executed. In the sequence processing program, necessary position and orientation data $P_i$ are taken out from the auxiliary memory unit 103 in accordance with an operation sequence specified beforehand by an operator or the like of the robot 10 (and typically stored in the auxiliary memory unit 103). The position and orientation data $P_i$ are transformed into a form similar to that of $\vec{X}$ indicated in the expression (3), as required. Further, operation velocity data and the like are similarly taken out, as required.

Succeedingly, the interpolation processing program 202 is activated to perform interpolation processing by using the above described position and orientation data $P_o$ and $P_i$. Although various forms can be considered for the interpolation processing, linear interpolation or circular interpolation is typically used. Representing $P_o$ and $P_i$ as $\vec{X}_o$ and $\vec{X}_i$ in vector forms in the same way as the expression (3), an example of linear interpolation becomes computation processing as represented by the relation $$\vec{X}_k = k\vec{X}_o + (1-k)\vec{X}_i. \quad (95)$$

The value of k may be successively changed from 0 to 1. That is to say, the value of k may be successively changed by an amount of change of k defined by a desired end effecting point operation velocity at intervals of the time $\Delta t$ indicated in the expression (7), for example.

The resultant $\vec{X}k$ becomes the output of the interpolation processing program 202 and is sent to the coordinate transformation program 203.

In the coordinate transformation program 203, the above described $\vec{X}k$ is used as the desired position and orientation 4 shown in FIG. 1, and the desired displacemant values 7 and 8 of respective joints of the robot are calculated by using the current position and orientation 1 of the robot in accordance with the procedure described by referring to FIG. 1.

The desired joint displacement values 7 and 8 undergo the necessary unit conversion and the like in the servo command output program 204 and are outputted to the servo amplifier 104.

The function of the servo amplifier 104 will now be described by taking the servo amplifier 104-1 corresponding to one joint as an example. The servo amplifier 104-1 derives the difference between the value fed back from the position detector 11-5 and the desired joint displacement inputted as described above and amplifies the difference. Further, the servo amplifier 104-1 derives the deviation from the value fed back from the velocity detector 11-4 and applies processing such as amplification to the deviation to output it toward the motor 11-1 as the drive command.

If the motor 11-1 is driven, the joint 11 of the robot 10 is driven via the reduction gear mechanism 11-2 until the aforementioned deviation and difference are eliminated. The result is fed back to the servo amplifier via the position detector 11-5 and the velocity detector 11-4.

In the control processing program 200, a command value is outputted by the above described servo command output program 204, and the program returns to the interpolation processing program 202 again. This is repeated until the robot 10 reaches the terminating point $P_i$ of the interpolation section. When the robot 10 reaches the terminating point $P_i$ of the interpolation section, the program further returns to the sequence processing program 201. By repeating the processing heretofore described until a specified sequence is finished, the end position and orientation of the robot 10 can be moved along a specified locus.

Even if the configuration and joint allotment of robot mechanism are complicated and it is difficult to obtain computation expressions for deriving strict solutions with respect to displacement values of respective joints of the robot to provide the position of the end effecting point of orientation at the end effecting point, i.e., so-called expressions of inverse kinematics, the present invention heretofore described makes it possible to implement an operation control method for robot capable of accurately satisfying at least one parameter to be controlled accurately without containing approximation errors in all of parameters of the position and orientation of the end effecting point to be controlled. As evident from the expression exemplified in the embodiment, the amount of computation processing according to the control scheme of the present invention is almost equal to that of the prior art. As for the load of the computation processing in real time control using a microcomputer or the like, there is no distinct problem as compared with the prior art, to an advantage.

We claim:

1. A control method for an industrial robot having a plurality of joints, cooperation of said joints allowing a hand or an end effector attached to the hand to perform necessary operation, comprising the steps of:

representing a position and orientation of a hand effecting point relatively determined with respect to said hand or said end effector by a predetermined coordinate system for describing said necessary operation;

deriving respective displacement values of said joints corresponding to said position and orientation represented by said coordinate system; and making said hand effecting point perform said necessary operation on a basis of said derived displacement values, wherein said displacement deriving step comprises the steps of:

approximately deriving displacement of at least that one joint by using an approximate solution which does not affect at least one parameter among a plurality of parameters representing the position and orientation of said hand effecting point; and strictly deriving displacement values of remaining joints among said plurality of joints on a basis of said approximately derived displacement value for said plurality of parameters excluding at least one parameter.

2. A control method according to claim 1, wherein said control method is used to control an industrial robot in which strict solutions of all the displacement values for said plurality of joints are either impossible to analytically derive or possible but only through complicated operations.

3. A control method according to claim 1, wherein said plurality of joints comprises a waist axis, an upper arm axis, a forearm axis, a first bending axis around said forearm, a second bending axis around an axis perpendicular to said first bending axis, and a twist axis around an axis perpendicular to said second bending axis, and wherein said first bending axis and said second bending axis do not intersect each other.

4. A control method according to claim 1, wherein said approximate solution is implemented by using Jacobian matrices.

5. A control method according to claim 4, wherein said displacement deriving step comprises the steps of:
- dividing a work area of said end effector into gratings beforehand;
- preparing a Jacobian matrix for each grating point beforehand; and
- deriving said approximate displacement by applying interpolation to relating Jacobian matrices.

* * * * *